Aug. 23, 1938.    H. G. LOMBARD    2,128,005
HAMMER DRIVEN SUPPORTING DEVICE
Filed June 25, 1937
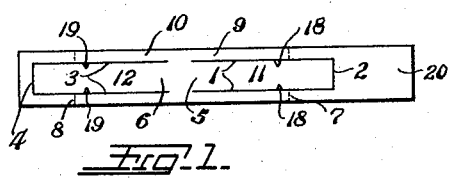
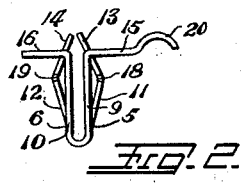
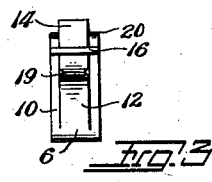
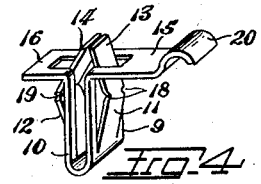
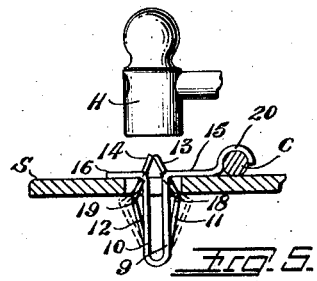
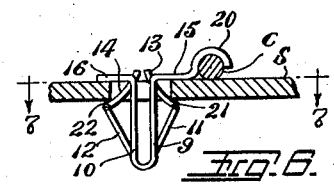
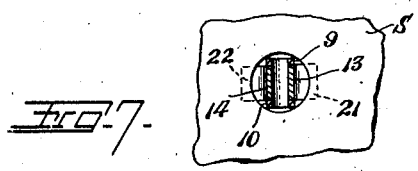
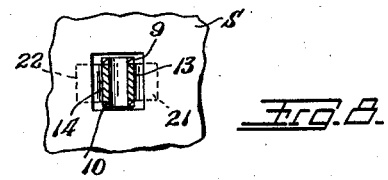
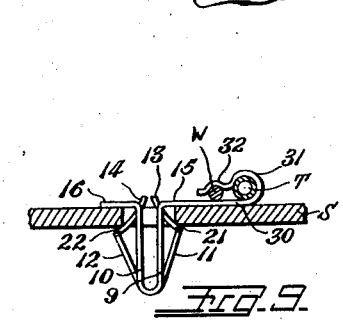
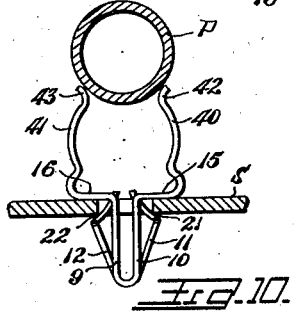
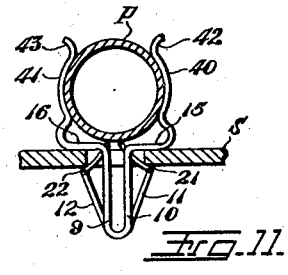
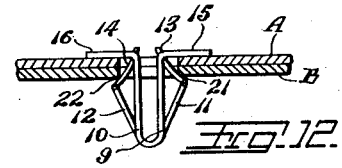
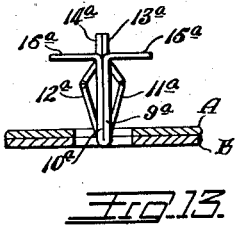
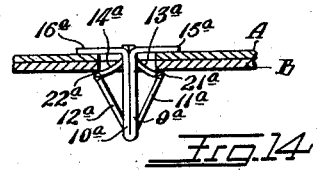
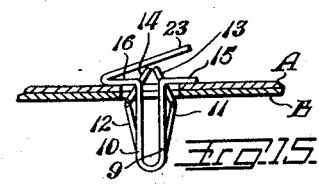
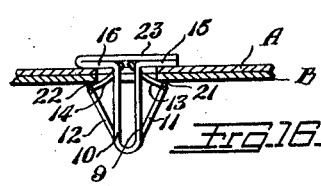

Patented Aug. 23, 1938

2,128,005

UNITED STATES PATENT OFFICE 2,128,005

HAMMER-DRIVEN SUPPORTING DEVICE

Herman G. Lombard, Washington, D. C., assignor to Albert H. Tinnerman, Cleveland, Ohio Application June 25, 1937, Serial No. 150,414

11 Claims. (Cl. 85—5)

This invention relates to means for mounting cables, conduits, electrical conductors, tube lines, rods, posts, and like objects in place upon a support.

More particularly, this invention is directed to stud fastening devices constructed from a minimum of relatively thin material of sheet or strip form, such as sheet metal, cold rolled metal, and the like, and designed for use in combination with conduits, cables and like objects for rigidly mounting the same in applied position on a support without danger of loosening or becoming accidentally removed incident to vibration, jarring and strain which may take place in the supporting member.

A specific illustration of the use to which the devices of this invention may be put is the mounting of the gas lines, conduits, and cables employed on automobiles. In mounting such objects, it is essential that the supporting means be capable of being easily and quickly applied and have a firm, rigid, engagement in applied position on the chassis or frame in order to withstand vibration, jarring and strain incident to use of the automobile. If, as a result of such vibration or the like, slippage occurs to such extent that the object is loose in its mounting, dangerous wear and offensive noises will result.

At the present time devices employed for mounting cables, tube lines, and the like, are bulky and cumbersome and also are unnecessarily expensive in manufacture due to the amount of material required in their construction. Some arrangements embody a well known form of clamp consisting of a section of sheet metal disposed around the tube or other object and provided with an apertured projecting end seating on the support and secured by a separate bolt fastening passing through an aperture in the support and engaging with the projecting end of the clamp. Other constructions for mounting cables, and like objects, embody securing devices comprising clips provided with shanks having a substantial snap-stud engagement in apertures provided in the frame. This form of device consists of cooperating shank legs which are relatively yieldable to engage in the aperture in a friction or press fit. Such a friction press fit has been found hardly effective to maintain a clip in applied position over any extended period of time under conditions of continuous, hard usage such as, for example, takes place in an automobile frame and chassis.

In any event, the support, frame or other chassis part must be provided with an aperture to receive the shank of a bolt or clip. The devices herein proposed do not in any way complicate the supporting structure now in use since all that is necessary is a simple aperture to receive the stud member comprising the shank of the device, while at the same time a less expensive, more durable and easily and quickly installed mounting for an object is provided.

This invention therefore contemplates the provision of inexpensive securing devices which may be constructed from a relatively small section of substantially flat metal, such as sheet metal, spring steel, cold rolled metal, and the like by a minimum of die operations and without loss or waste of material whatsoever.

A further object is to provide a device constructed from a substantially flat blank and comprising a shank member including elements adapted to be collapsed to anchored engagement in an apertured part in a substantial expanding action to seat the device and rigidly retain an object in applied position on such part.

Another object is to provide in such a device a shank member having shank elements including projecting portions to which hammer blows or the like may be applied to cause a collapse of the shank elements in a substantial expanding into deformations serving to retain the device in applied position in an aperture.

A still further object is to provide a device functioning substantially as a sheet metal rivet and comprising a shank element applicable to superposed apertured members readily accessible from one side only and including a projecting portion which may be deformed as by hammer blows applied thereto from the accessible side to distort the shank element and thereby rigidly connect the superposed members.

Further objects and advantages of the invention will be apparent to those skilled in the art as a description thereof proceeds with reference to the accompanying drawing in which like reference characters designate like parts throughout the same, and in which:

Fig. 1 represents a blank of which a form of the improved devices may be constructed;

Fig. 2 shows in side elevation the improved device constructed from the blank of Fig. 1;

Fig. 3 is an end view of Fig. 2;

Fig. 4 is a perspective of the device shown in Figs. 2 and 3;

Fig. 5 shows the device as applied to an apertured support for mounting a cable, or the like, preparatory to distorting the shank elements to anchored relation in the aperture;

Fig. 6 shows the device in final applied position retaining an object on a support with the shank elements distorted to anchored relation;

Fig. 7 is a section on line 7—7 of Fig. 6 showing the application of the device in a round aperture in the support.

Fig. 8 is a similar view in a rectangular aperture;

Fig. 9 shows in side elevation an alternate construction of the clip for use as a supporting device;

Fig. 10 shows a still further construction of the clip as an object supporting device, the object being shown about to be applied to the supporting elements of the device;

Fig. 11 is a view similar to that of Fig. 10 showing the object in final applied position;

Fig. 12 shows the device as employed for use in securing superposed apertured parts;

Fig. 13 shows a modification of the device as applied for securing superposed apertured members in the manner of a sheet metal rivet;

Fig. 14 shows the device represented in Fig. 13, with the shank elements in distorted position securing the superposed members;

Fig. 15 shows a further modification wherein the device is provided with a cap which also serves as a means facilitating distortion of the shank elements; and, Fig. 16 shows the device of Fig. 15 in its final applied position.

This invention contemplates the provision of a simple, one-piece fastening device for application to apertured work from one side of such work and comprises substantial U-shaped stud members which may be passed through an aperture from one side of a support and then distorted from such side to expand the stud member inserted through the aperture whereby the device is fixedly retained in applied position mounting an object on the support. Such fastening devices are particularly useful in all-metal constructions in which holes in the support are provided as by punching or drilling and wherein the shanks of the stud fastenings are not accessible for upsetting after being inserted into the holes.

In another relation, the securing devices comprise a shank structure functioning substantially in the manner of a sheet metal rivet applied to superposed apertured parts accessible from one side only. In either use, the shank structure which is obtained is, for the main part, a substantial U-shaped stud member embodying shank elements adapted to be distorted in anchored relation in an aperture by projecting portions which may be deformed as by hammer blows, to cause an expansion, distortion and deformation of the shank elements in the aperture.

Referring to the drawings, Fig. 1 represents a blank from which a preferred form of the device may be constructed. The blank is a substantially rectangular section and accordingly may be obtained without waste from strip stock or sheet material of any suitable form such as sheet metal, cold rolled metal, and the like.

The blank is suitably slit within its periphery along the lines indicated at 1, 2, and 3, 4, Fig. 1, to provide the elements 11, 12 free at one end and integral with an intermediate portion of the blank as at 5, 6. The blank is then folded back upon itself to provide a substantially U-shaped shank comprising legs 9, 10, Fig. 2 carrying shank elements 11, 12 integral therewith adjacent the base of the U as at 5, 6. The blank also is bent along lines 7, 8, Fig. 1, to provide the head sections 15, 16, comprising the head member of the device. In so providing the head sections, the extremities 13, 14 of the shank elements 11, 12 are caused to project above said head sections as shown in Figs. 2-4 inclusive to be utilized for receiving hammer blows, or the like, in a manner hereinafter more fully set forth.

In order to weaken the shank elements 11, 12, to provide for ready collapse thereof in an expanding action, suitable weakening means such as notches or recesses 18, 19, are provided as shown in Figs. 2, 3, and 4. Such weakening means may be of any suitable outline and may be provided in the same stamping and slitting operation by which the blank is obtained as represented in Fig. 1. Preferably, the said weakening notches are so disposed longitudinally of the shank elements 11, 12 as to ensure a collapse thereof at the most effective point depending on the thickness of the supporting member substantially as indicated by the dotted line position of the shank elements in Fig. 5.

It is also desirable that the shank elements be deformed intermediate their lengths such as to tend toward collapsing relation in the aperture in the most effective manner; and accordingly the shank elements may be bowed as shown in Fig. 2 with the extremities of the projecting portions 13, 14 in substantial abutting relation to uniformly receive hammer blows, or the like, applied thereto.

As shown in Figs. 2 to 6 inclusive, one of the head sections 15, 16 is so designed as to include an object engaging portion 20 adapted to retain an object such as tube, line, wire, cable, or the like, in fixed relation on the support. This object engaging section may be of any suitable shape and preferably is fashioned to the contour of the object to thereby snugly engage the same in clamping relation against the adjacent face of the support. Although the object engaging portion is shown as provided from an end-edge of a head section, it is obvious that it may as well be obtained from a side-edge thereof, and, if desired, may embody cooperating sections provided from each of the said head sections 15, 16.

From the foregoing it will be seen that when the shank member of a device is inserted into an aperture in a support S, Fig. 5, with section 20, in engagement with an object such as cable C, the head sections 15, 16, are seated rigidly on the support with the portions 13, 14, of the shank elements 11, 12, projecting thereabove in suitable relation to receive hammer blows as by hammer H, thereby causing a collapse and distortion of the shank elements substantially to the position indicated by the dotted lines in Fig. 5, and in full lines in Fig. 6. Thus the shank elements 11, 12, are deformed into pronounced locking shoulders 21, 22, in rigid engagement with the adjacent walls of the aperture to anchor the device in position. The provision of such shoulders is ensured by the weakening notches 18, 19, which are so disposed on the shank elements as to form the shoulders at the most effective points with respect to the thickness of the support when the said shank elements are caused to be collapsed.

It will therefore be seen that the function and application of the shank member of the improved device is substantially similar to that of an expansion stud such as a sheet metal rivet and which is so permanently retained in its final applied position on the support that removal thereof may not be effected without destruction of the same. In this relation it will be readily understood that the device provides a most rigid, permanent mounting of an object on the support and thereby eliminates danger of loosening or accidental removal in installations subject to vibration or jarring effects, as for example, in the chassis or other supporting structure of an automobile.

Fig. 9 shows an alternate construction of the device as a means for supporting an object or a plurality of objects on a support, S. In this form of the device one of the head members, 15, may be provided with an integral extended section 30, which is bent back upon itself to provide a pair of clamping arms adapted to grippingly engage an object or plurality of objects between them. Preferably the clip-arm provided by the return bend is deformed into substantial corrugations 31, 32, designed to snugly engage an object or plurality of objects such as a tube T, and wire W, in desired mounted position on the support.

Figs. 10 and 11 show a further construction of the device as designed for supporting an object having a relatively large cross-section such as a pipe, P. In this form of the device the head sections 15, 16 are both provided with integral extensions 40, 41 which are so deformed as to frictionally and grippingly engage the object between them. In use, the shank member of this form of the device is anchored in the aperture in the support in the manner described above with reference to the form of device shown in Fig. 5, whereupon the object P, may be introduced between the embracing arms 40, 41 to be retained in applied position on the support as shown in Fig. 11. To facilitate introduction of the object between the embracing arms 40, 41, the extremities thereof may be deformed outwardly as at 42, 43 to provide a flared entrance for the object whereupon the same may be readily applied to mounted relation between the embracing arms.

Figs. 12 to 14 inclusive show an application of the device in which the object engaging elements may be omitted from the head sections 15, 16 of the device and employed for use as a sheet metal rivet for rigidly uniting superposed apertured parts A, B. The application of this form of the device for anchoring the same in the aperture in the superposed parts is identical to that described above with reference to Figs. 1 to 8 inclusive.

In Figs. 13 and 14, an alternate construction is shown in which the legs 9a, 10a, comprising the shank member are disposed against each other to rigidify the shank in its applied fastening position; and accordingly, the extremities of the shank elements 11a, 12a, may abut directly against each other for a portion of their lengths thus rigidifying the projections 13a, 14a which extend above the head sections 15a, 16a for receiving hammer blows to expand the shank elements 11a, 12a into the pronounced anchoring shoulders 21a, 22a as shown in Fig. 14.

In certain applications it is desirable that the devices present an imperforate surface and a smooth appearance in final applied position. In Figs. 15 and 16, a form of the device is represented in which a cap member 23 may be provided from an extension of one of the head sections 15 or 16. This cap member preferably is so designed as to completely cover the head member provided by sections 15, 16, and at the same time is designed to overly the projecting portions 13, 14, in a substantial bearing relation preparatory to distorting the shank elements 11, 12. Upon application of hammer blows to the said cap member 23, an axial thrust is transmitted to the projecting portions 13, 14 whereupon the shank elements are caused to be collapsed into anchoring shoulders 21, 22, Fig. 16; and thus in its final applied position, the cap member 23 lies flat with respect to the supporting part and not only serves as a covering for the head member of the device presenting an imperforate surface, but also acts to retain the shank elements 11, 12 in collapsed anchoring position in rigid engagement with the extremities of the projecting portions 13, 14 as shown in Fig. 16.

From the foregoing, it will be understood that the instant invention contemplates a simple and efficient one-piece device admirably suited for fastening engagement with a part accessible from one side only, and also provides a shank member readily adapted for insertion and locking engagement in an aperture in a part by simple means such as hammer blows applied thereto from the accessible side of the support only, without requiring special tools and time consuming assembling operations.

It will be further appreciated that the improved device is capable of any number of uses in blind locations for mounting objects or rigidly uniting parts and is particularly adapted for most economical manufacture in quantity production to meet the severe, practical requirements of present-day use.

While the invention has been described in detail with specific examples such examples are illustrative only, since it will be apparent to those skilled in the art that other modifications within the spirit and scope of this invention may be constructed without departing from the teachings or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A one-piece sheet metal fastening device comprising an integral bearing member and shank member, said integral shank member depending from said bearing member to be received in an aperture in a support, a shank element having a free end struck and formed from said shank member, said free end of the shank element including a portion projecting above the said bearing member, said projecting free end portion of the shank element being adapted to receive hammer blows and thereby cause a distortion of the shank element in anchored engagement in the aperture in the support.

2. A one-piece sheet metal fastening device complete in itself comprising a strip of metal bent intermediate the ends thereof to provide an integral bearing member and substantially U-shaped shank member, said integral shank member depending from said bearing member to be received in an aperture in a support, a collapsible shank element carried by said shank member including a free end portion projecting above said bearing member, said projecting free end portion of the shank element being adapted to receive hammer blows and thereby cause a distortion of the shank element in anchored engagement in the aperture in the support.

3. A one-piece fastening device comprising a body of metal formed to provide an integral bearing member and shank member, said integral shank member depending from said bearing member to be received in an aperture in a support, a shank element formed from the material of said shank member including a projecting portion struck from the said bearing member, said projecting portion of the shank element being adapted to receive hammer blows and thereby cause a distortion of the shank element in anchored engagement in the aperture in the support.

4. A one-piece fastening device comprising a body of metal formed to provide an integral bearing member and shank, said integral shank comprising a pair of leg members depending from said bearing member to be received in an aperture in a support, one of said leg members comprising a collapsible shank element formed therefrom and including a projecting free end portion struck from the said bearing member, said projecting free end portion of the shank element being adapted to receive hammer blows and thereby cause a distortion of the shank element in anchored engagement in the aperture in the support, said bearing member serving to prevent the device from passing into the aperture upon the application of hammer blows.

5. A one-piece fastening device comprising a strip of sheet metal bent to provide an integral bearing member and a shank member, said integral shank member depending from said bearing member to be received in an aperture in a support, a collapsible shank element struck and formed from the material of said shank member including a projecting free end portion struck from the said bearing member, said projecting free end portion of the shank element being adapted to receive hammer blows and thereby cause a distortion of the shank element in anchored engagement in the aperture in the support, said bearing member serving to prevent the device from passing into the aperture upon the application of hammer blows.

6. A one-piece fastening device comprising a strip of sheet metal bent intermediate its ends to provide an integral bearing member and a substantially U-shaped shank member, said shank member depending from said bearing member to be received in an aperture in a support, a collapsible shank element struck and formed from said shank member and including a free end portion projecting above the said bearing member, said shank element being provided with weakening means to ensure a collapse thereof, said projecting free end portion of the shank element being adapted to receive hammer blows to cause a distortion of the shank element in anchored engagement in the aperture in the support, and said bearing member serving to prevent the device from passing into the aperture upon the application of hammer blows.

7. A one-piece fastening device comprising a strip of sheet metal bent intermediate its ends to provide an integral bearing member and a substantially U-shaped shank comprising a pair of leg members depending from said bearing member to be received in an aperture in a support, a collapsible shank element struck and formed from each said leg members including free end portions projecting above the said bearing member, said shank elements being provided with weakening means to ensure a collapse thereof, said projecting free end portions of the shank elements being adapted to receive hammer blows to cause a distortion thereof in anchored engagement in the aperture in the support, and said bearing member serving to prevent the device from passing into the aperture upon the application of hammer blows.

8. A one-piece device complete in itself and constructed from a blank of sheet metal, comprising a head member adapted for bearing engagement on an apertured part, an integral substantially rigid shank carried by said head member and comprising a leg member adapted to be received in the aperture in said part, a collapsible shank element struck from said shank member and free at one end to provide a portion projecting above the said head member, said projecting portion being adapted to receive hammer blows to cause a distortion and collapse of the shank element into a pronounced shoulder in anchored engagement in the aperture in the said part.

9. A one-piece device complete in itself and constructed from a blank of sheet metal, comprising, a head member bearing on an apertured part and embodying a pair of head sections, an integral substantially rigid shank carried by said head sections and comprising a pair of leg members adapted to be received in the aperture in said part, a collapsible shank element struck from a shank leg member and free at one end to provide a portion projecting above the said head sections, said shank element being provided with weakening means to ensure a collapse thereof at the most effective point depending on the thickness of the part, said projecting portion being adapted to receiver hammer blows to cause a distortion and collapse of the shank element into a pronounced shoulder in anchored engagement in the aperture in the said part.

10. For application and anchoring engagement in an apertured part from one side of such part, a one-piece device complete in itself and constructed from a blank of sheet metal, comprising a head member adapted for bearing engagement on said part and having an opening therein, an integral substantially rigid shank carried by said head member and comprising a leg member adapted to be received in the aperture in said part, a collapsible shank element struck from said shank member and free at one end to provide a portion projecting above the said head member through the opening therein, said projecting portion being adapted to receive hammer blows to cause a distortion and collapse of the shank element into a pronounced shoulder in anchored engagement in the aperture in the said part.

11. For application and anchoring engagement in an apertured part from one side of such part, a one-piece device complete in itself and constructed from a blank of sheet metal, comprising, a head member bearing on the apertured part and embodying a pair of head sections having an opening therebetween, an integral substantially rigid shank carried by said head sections and comprising a pair of leg members adapted to be received in the aperture in said part, collapsible shank elements struck from said shank leg members and free at one end to provide portions projecting above the said head sections through the opening therebetween, said shank elements being provided with weakening means to ensure a collapse thereof at the most effective point depending on the thickness of the part, said projecting portions being adapted to receive hammer blows to cause a distortion and collapse of the shank elements into pronounced shoulders in anchored engagement in the aperture in the said part.

HERMAN G. LOMBARD.